US006950153B2

(12) United States Patent
Lane

(10) Patent No.: US 6,950,153 B2
(45) Date of Patent: Sep. 27, 2005

(54) VIDEO IMAGE ROTATING APPARATUS

(75) Inventor: Marc S. Lane, Topanga, CA (US)

(73) Assignee: 360 TV, Inc., Los Angeles, CA (US)

( * ) Notice: Subject to any disclaimer, the term of this patent is extended or adjusted under 35 U.S.C. 154(b) by 550 days.

(21) Appl. No.: 10/125,011

(22) Filed: Apr. 17, 2002

(65) Prior Publication Data

US 2002/0167618 A1 Nov. 14, 2002

Related U.S. Application Data

(60) Provisional application No. 60/284,341, filed on Apr. 17, 2001.

(51) Int. Cl.[7] .................................................. H04N 5/74
(52) U.S. Cl. ......................... 348/744; 348/37; 348/756; 359/446
(58) Field of Search ........................... 348/36, 37, 744, 348/750–757, 759–764, 787, 789; 345/31; 353/74, 79; 359/446, 456, 460

(56) References Cited

U.S. PATENT DOCUMENTS

| 3,976,837 | A |   | 8/1976  | Lang           |        |
|-----------|---|---|---------|----------------|--------|
| 4,760,443 | A | * | 7/1988  | Secka          | 348/37 |
| 4,901,140 | A |   | 2/1990  | Lang           |        |
| 4,943,851 | A |   | 7/1990  | Lang           |        |
| 4,979,026 | A |   | 12/1990 | Lang           |        |
| 5,040,055 | A | * | 8/1991  | Smith          | 348/39 |
| 6,072,545 | A |   | 6/2000  | Gribschaw      |        |

FOREIGN PATENT DOCUMENTS

| JP | 1-189288 A | 7/1989 |
| JP | 6-273693 A | 9/1994 |

* cited by examiner

Primary Examiner—Victor R. Kostak
(74) Attorney, Agent, or Firm—Kelly Lowry & Kelley, LLP

(57) ABSTRACT

A video image rotating apparatus includes a rear projection screen rotatably disposed in a generally horizontal plane, thus allowing only a single mirror to be angularly positioned over the screen to project video images to viewers. An optical system is positioned below the screen and vertically aligned therewith for projecting video images onto the screen. Preferably, the video images are mechanically rotated by rotating a portion of the optical system at a rate of rotation that is one-half that of the screen so that all viewers surrounding the video image rotating apparatus will see the same picture substantially simultaneously and continuously. Alternatively, the video images produced by the optical system may be rotated by an electronic image rotation system that electronically rotates the images produced in synchronization with rotation of the screen.

36 Claims, 6 Drawing Sheets

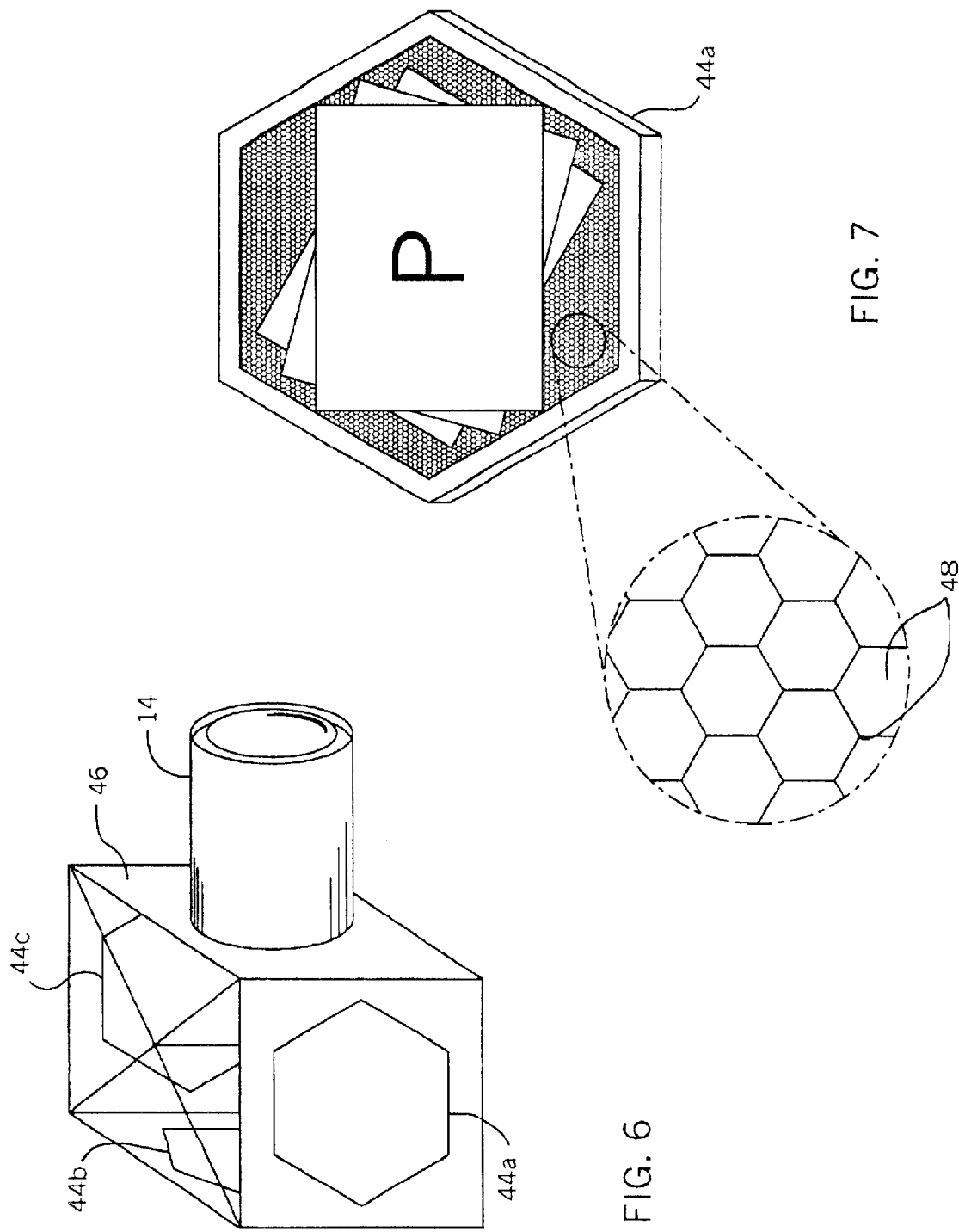

VIDEO IMAGE ROTATING APPARATUS

RELATED APPLICATION

The present invention claims priority from U.S. Provisional Application No. 60/284,341 filed Apr. 17, 2001.

BACKGROUND OF THE INVENTION

The present invention generally relates to image projection and television viewing systems. More particularly, the present invention relates to an apparatus for enabling a centrally located video image to be viewed substantially simultaneously by an audience surrounding the image through a 360° span.

The general problem in the display of a picture print, a television image or a projection onto a screen is that the picture is best viewed when the viewers line of sight is precisely normal to the plane of the picture. Traditional television sets are relatively flat and square. These television sets must be positioned strategically within a room so that they are easily viewed by the viewers. When a viewer is not positioned directly in front of the television set, the best possible viewing angle is not achieved, or a viewing angle is not achieved at all. Thus, it is difficult for several people wishing to view a picture simultaneously from varied locations.

Placing four television sets back-to-back does not create a 360° angle, as in reality there are only four points or four direct viewing angles in which the viewer has the proper angular view of the television. Furthermore, placing four existing television sets back-to-back in an attempt to create a 360° viewing angle is rather costly as four television sets must be purchased.

Another solution is to simply mount a picture on a rotating pedestal which will slowly rotate over 360°, permitting several people surrounding the pedestal to eventually view the picture in a line of sight normal to the plane of the picture. Such systems are often used in advertising displays within large areas such as railroad stations and the like. A problem with such an arrangement is that the rotation of the picture must be relatively slow in order to permit the various viewers to have an opportunity to study the picture. Such a slow rotation means that essentially only a few people at a time are viewing the picture while others out of the line of sight must wait until the picture comes into view.

There are many instances in which several people may wish to view a picture or displayed data simultaneously and continuously so that they can all carry on a meaningful discussion concerning the displayed information. For example, during business meetings a group of executives typically sit around a conference table, an arrangement which does not readily enable information presented to be displayed to all in attendance. A great benefit would be realized if a means centrally located on the table were available which would permit everyone present to examine a picture or projected substantially simultaneously. For example, the necessity of passing among the members of the group pictures to be successively viewed would be avoided. In addition, the ability to display data through a 360° range would prevent members from looking at a series of pictures out of order, a potential problem if duplicate sets of pictures were to be provided to each individual member.

Another drawback associated with conventional display systems is that special consideration must be given to the positioning of the display within its environment because, typically, conventional display systems, such as a television, cannot be viewed from the rear or extreme sides. Thus, the area within which a viewing audience can be accommodated is limited to locations with suitable sight lines. As a result, use of the space available around the display system is often limited by the presence of blind spots. Moreover, the positioning of furniture within the room can disadvantageously be dictated by a need to provide clear sight lines to a television or the like.

In an attempt to overcome the viewing limitations associated with conventional displays, 360° viewing systems have been developed, examples of which are shown in U.S. Pat. Nos. 3,976,837; 4,901,140; 4,943,851 and 4,979,026, the contents of which are incorporated herein by reference.

Such systems disclosed in these patents suffer from a visually perceptible blur at the edge of the projected image as it rotates past the viewer's line of sight. It was found that blurring of the image could be reduced by providing a slit in front of the projection screen, which rotated together with the screen, although only a very small fraction of the projected image passed through the slit to reach the eye of the observer. Thus, the apparent screen brightness was found to be fifty to one-hundred times less than the brightness of the stationary screen.

U.S. Pat. No. 6,072,545, the contents of which are incorporated herein by reference, discloses a video image rotating apparatus designed to minimize the visible blur at the edge of a projected video image and increase the apparent brightness of the rotational screen. The apparatus of the '545 patent presents a projected image upon a rear projection screen that is rotated extremely rapidly about a vertical axis which exactly bisects the picture in the vertical plane. While substantially eliminating blurred edges and intensifying the perceived brightness of the image, the apparatus requires a plurality of three to four mirrors to erect an image from its original horizontal position to the vertical position of the projection lens screen. The rotation of the three or more erecting mirrors requires a relatively large area behind the lens screen. This limits the proportion of the final image size with respect to the overall drum size of the apparatus. The three or more mirror erection system also requires precise placement of the mirror system relative to each other in the optical pathway in order to project an image to the rear projection lens screen.

The apparatus of the '545 patent also incorporated an electronic image rotation system for electronically rotating the images produced by light valves in synchronization with rotation of the rear projection screen. Such electronic rotation system requires a fairly complex synchronization separator circuit, memory, and an algorithm-further complicating the device and adding increased costs.

Accordingly, an improved 360° viewing system is needed that is simpler in design so as to require less space and expense while eliminating visible blurs at the edges of the projected video image and providing sufficient screen brightness. The present invention fulfills these needs and provides other related advantages.

SUMMARY OF THE INVENTION

The present invention resides in a video image rotating apparatus, or 360° viewing system which enables the video image to be viewed substantially simultaneously by an audience surrounding the picture through a 360° arc.

The apparatus generally comprises a rear projection screen rotatably disposed in a generally horizontal plane and having a single mirror angularly positioned over the screen so as to rotate with the screen. An optical system is positioned below the screen and aligned therewith for projecting images onto the screen. Means are provided for synchronously rotating the screen and the projected images at a predetermined relative rate of rotation such that all viewers see the projected images substantially simultaneously.

The video image rotating apparatus has a broad range of applications, including advertising marques, television sets and display screens for presenting travel information at airports, train stations and bus depots. The present invention advantageously enables information to be communicated simultaneously to a large audience because a 360° is presented which maximizes sight lines to the viewing system and eliminates blind spots. This feature beneficially allows great flexibility and the positioning of furniture and the viewing system within a viewing area, thereby providing greater freedom of choice and the utilization of the space within the viewing area.

Typically, the apparatus includes a rotatable drum supporting the screen in a base thereof. The mirror is supported by the drum and positioned at a 45° angle over the screen so that the image projected therethrough is reflected at a normal angle corresponding with a line of sight of the viewers. A conical member is disposed between the optical system and the screen to facilitate the projection of the images onto the screen.

The rear projection screen preferably includes means for expanding the projected image generally parallel to the screen's axis of rotation, as well as means for restricting the length of the projected image generally perpendicularly to the screen's axis of rotation. The expanding means comprises a micro-cylindrical structure parallel to the length of the projection screen on top of a positive macro cylindrical structure parallel to the length of the projection screen. The means for constricting the width of the projected image generally perpendicular to the screen's axis of rotation comprises a second surface of the screen that forms a fresnel positive cylindrical lens parallel to the length of the projection screen.

The optical system includes a projector or light valve means for creating the image, and an optic means. The light valve means comprises a plurality of light valves and a Phillips prism that aligns images produced by the light valves for projection through the optic means. The optic means comprises a Pechan prism and a projection lens assembly. The optical system, and more particularly the optic means, is vertically aligned with a center axis of the screen.

The video image produced by the projector may be either mechanically rotated or an electronic image rotation system may be utilized for electronically rotating the images produced by the light valves in synchronization with rotation of the screen. In either case, the screen and mirror are rotated with the use of a motor.

The electronic image rotation system includes a color processor circuit for separating red, green and blue signals contained in a composite video input signal. Analog to digital conversion means are provided for converting the red, green and blue signals from analog to a digital format. The digital red, green and blue image data are stored in random access memory means. An output address generation circuit selects data stored in the random access memory means according to an algorithm that creates a rotated video output signal from the stored image data such that an image recreated from the rotated video output signal will appear rotated from the stored image. When utilizing the electronic image rotation system, the optical system, more particularly the optic means, are not rotated, but the screen, mirror and drum are rotated.

In a particularly preferred embodiment of the present invention, the motor rotates the screen and mirror at a first rate of rotation, and rotates a portion of the optical system at a second rate of rotation. This is typically performed using a first gear and pulley assembly interconnected to a shaft of the motor and the screen and mirror, and a second gear and pulley assembly interconnected between the shaft of the motor and the optical system. The motor is connected to the optic means comprising a Pechan prism and projection lens assembly to rotate the Pechan prism at a rate of rotation which is one-half of that of the rotation of the screen and mirror.

It is necessary that the video image be rotated through the optical means in sync with rotation of the projection screen so that the same video image in the same orientation may be viewed throughout the entire 360° arc during operation of the apparatus. This enables any viewer in the audience to periodically have a line of sight in alignment with a proper viewing angle for the projected image. When the rotational rate and revolutions per minute is sufficiently great, all viewers surrounding the video image rotating apparatus will see the same picture substantially simultaneously and continuously.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is a perspective schematic view of three light valves surrounding a Phillips prism which aligns images produced by a projector for projection through the lens assembly of FIG. 3;

FIG. 7 is a schematic representation of a face of one of the light valves shown in FIG. 6, illustrating the step-wise of a video image produced thereon and the inclusion of hexagonal pixels on the face of the light valve to facilitate such step-wise rotation.

DETAILED DESCRIPTION OF THE PREFERRED EMBODIMENT

Figure 1:
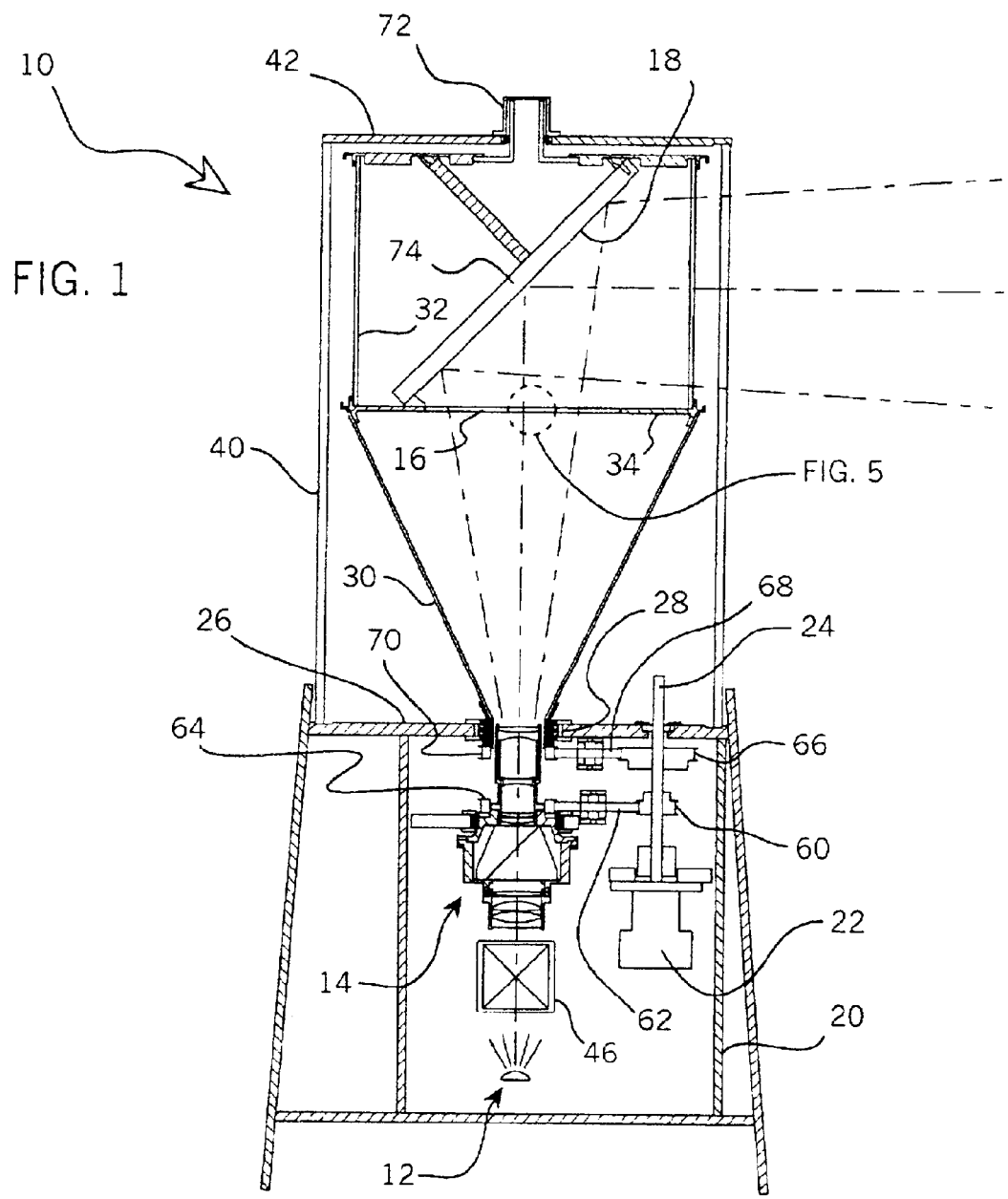
FIG. 1 is a cross-sectional view of a video image rotating apparatus embodying the present invention.

As shown in the drawings for purposes of illustration, the present invention resides in a video image rotating apparatus 10 which enables a video image to be viewed substantially simultaneously by an audience surrounding the apparatus through a 360° arc.

With reference to FIG. 1, the apparatus 10 generally includes a projector 12 which produces video images, a lens assembly 14 which receives the projected images from the projector 12 and directs the images onto a rear projection screen 16 which is disposed in a generally horizontal position. In order to simplify the design of the apparatus 10, the projector 12 and lens assembly 14 are vertically positioned directly below the rear projection screen 16 so as to be aligned therewith. A mirror 18 is angularly disposed over the rear projection screen 16 and reflects the video image to viewers. As will be described more fully herein, the video image is rotated in synchronization with the rotation of the screen 16 and mirror 18 such that all viewers surrounding the apparatus 10 in a 360° arc see the projected images substantially simultaneously.

The video image rotating apparatus 10 has a broad range of applications, including advertising marques, television sets and display screens for presenting travel information at airports, train stations and bus depots. The present invention advantageously enables information to be communicated simultaneously to a large audience because a 360° display is presented which maximizes sight lines to the viewing system and minimizes blind spots. This feature beneficially allows great flexibility in the positioning of furniture and of the viewing system within a viewing area, thereby providing greater freedom of choice in the utilization of space within the viewing area. Moreover, the video image rotating apparatus 10 of the present invention specifically overcomes drawbacks noted in connection with similar prior systems. In particular, blurring of the video image has been reduced or eliminated to the extent possible. Moreover, the present invention advantageously utilizes light valve technology that permits a sharp image to be produced and projected through the optical system of the apparatus. The combination of light valve technology and the novel projection screen results in an image that may be thirty times brighter than the source image would be on a normal screen.

In accordance with the present invention and with reference to FIGS. 1–4, the apparatus 10 includes a housing 20 forming a base of the apparatus 10 and in which is situated the projector 12, lens assembly 14, an electric motor 22 having a shaft 24 which is operably connected to rotate the screen 16 and mirror 18, and in the preferred embodiment of the present invention the lens assembly 14, as will be more fully described herein. The housing 20 includes an upper base plate 26 having an aperture 28 therethrough and generally aligned with the lens assembly 14. A generally conical member 30 has a small open end thereof aligned with the aperture 28, and in the preferred form of the invention rotatably connected with respect to the fixed base plate 26 such as by bearings or the like. An upper larger opening of the cone 30 supports a generally cylindrical drum 32 having a generally rectangular aperture in a base 34 thereof into which the rear projection screen 16 is inserted. The drum 32 also supports the mirror 18 in a generally 45° angle over the projection screen 16. Preferably, substantially all of the outer circumference 36 of the drum is opaque with the exception of a transparent window 38 directly in front of the mirror 18 and screen 16.

A clear acrylic cylinder 40 extends upwardly from the base plate 26 so as to surround and encompass the conical member 30 and drum 32. A top plate 42 overlies the cylinder 40 to enclose an air-tight chamber in which the drum 32, mirror 18, screen 16, and conical member 30 rotate. Preferably, when the screen 16, and related components, are being rotated, a vacuum is drawn inside of the cylinder 40 to reduce air flow and drag on the inner rotating drum 32, and also to reduce noise. Since the outer stationary cylinder 40 is transparent, observers surrounding the apparatus 10 would look to view a portion of the mirror 18, which reflects the screen 16 or the image produced thereby, through the window 38, as it rotates into the viewers line of sight. Preferably, the window spans a 550 arc relative to the circumference of the drum 32 and cylinder 40. As the rear projection screen 16 and mirror 18 are fixed in place with the drum 32, these are always aligned with the window 38.

The apparatus 10 utilizes a projection system such as a LCD projector which combines a red, blue and green field of video to create a full color video and image. The projector 12 includes a high intensity light source such as a metal halide lamp. With reference to FIGS. 6 and 7, in a particularly preferred embodiment, the projector 12 includes three light valves 44a–44c and an Phillips prism 46.

The light valve 44 presently preferred is the Proxima 9200 3-chip, polysilicone liquid crystal display (LCD) light valve manufactured by Sanyo. Such a light valve has a resolution of 1024×768. Other light valves, however, may be advantageously utilized in connection with the present invention, such as the Texas Instrument digital light processor (DLP), with three micro-mirror devices (DMD). The term light valve as utilized in connection with this invention includes LCD valves, grating light valves (GLV), digital micro-mirror devices (DMD) or other reflective or transmissive devices capable of producing an image from digital input.

The three light valves 44a–c are arranged around the Phillips prism 46, which acts to optically overlap the images created by the light valves. The standard form of light valves consists of a row and column layout of the individual pixel elements. For most applications, this application is quite adequate. However, as illustrated in FIG. 7, a hexagonal mosaic for the pixels 48 is preferred. As illustrated in FIG. 7, when an image of, for example, high definition drawings, is formed on a light valve made up of hexagonal pixels 48, the pattern of the pixels will be identical for at least six different orientations. That is to say that when an image is rotated on the light valve, it will have exactly the same appearance in six positions.

The use of light valves 44a–c is advantageous for the video image rotating apparatus for a number of reasons, not the least of which is the small physical size of a typical light valve panel such as a DVD, LCD or GLV. Typically such light valves are approximately one inch square. Also the frame rate of a light valve is much higher than a conventional CRT imaging system. Light valves can produce frame rates much higher than a CRT. Furthermore, the brightness levels achieved through light valve technology is in the thousands of ANSI lumens, thus making the use of light valves ideal for use in the video image rotating apparatus 10.

Figure 2:
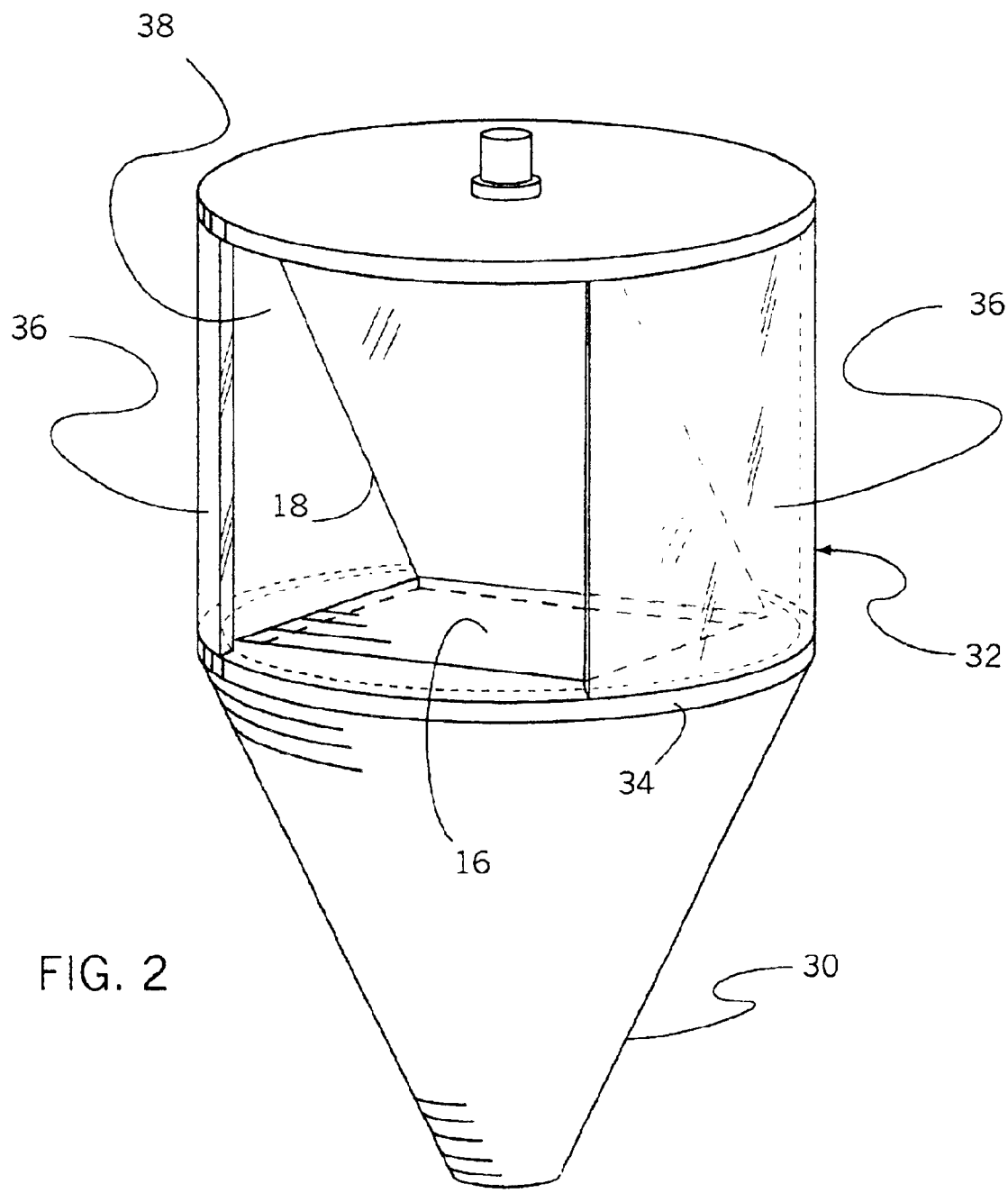
FIG. 2 is a top and side perspective view of a cone, drum, screen and mirror used in the apparatus of FIG. 1 to project an image across a 360° arc.
Figure 3:
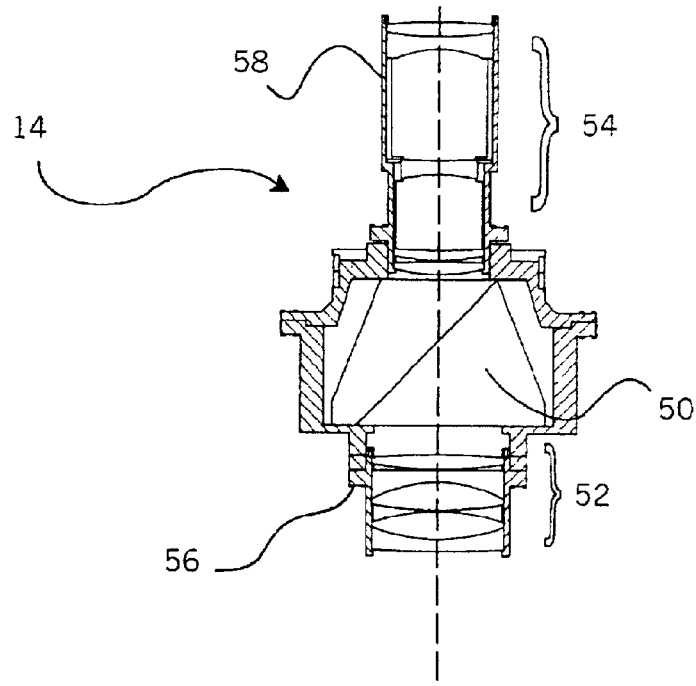
FIG. 3 is a cross-sectional view of a projection lens assembly and a Pechan prism used to direct images onto a screen in accordance with the present invention.

With reference to FIGS. 1–3, the overlapping images produced by the light valves 44a–c are projected through the Phillips prism 46 to the lens assembly 14. The lens assembly 14 comprises a Pechan prism 50 disposed between two sets of refractive lenses 52 and 54. The first set of lenses 52 is positioned within a rear or bottom lens barrel 56, and the second set of lenses 54 is positioned within a front or top lens barrel 58. Lens spacers, as necessary, are utilized to properly position the individual lenses to achieve the desired optical effect through the lens assembly 14.

The Pechan prism 50 advantageously expands the video image received from the projector 12. In a particularly preferred embodiment of the present invention, the Pechan prism 50 is mechanically rotated in synchronization with the rotation of the rear projection screen 16 such that the image provided on the screen 16 will be the same regardless of the position of the screen 16 and mirror 18 as they rotate through the 360° arc. Otherwise, the image would change orientation throughout the 360° arc of rotation.

With reference to FIG. 1, in order to rotate the Pechan prism 50, a drive pulley or gear 60 is attached to the shaft 24 of the motor 22 so as to rotate therewith. A belt 62 or the like interconnects the drive pulley 60 attached to the shaft 24 and a second drive pulley or gear 64 associated with the lens assembly 14 so as to rotate the lens assembly 14 about its vertical axis as the motor shaft 24 rotates.

With continuing reference to FIG. 1, a second gear or drive pulley 66 is also attached to the motor shaft 24. A belt or the like 68 interconnects this driven pulley 66 with a gear or pulley operably associated with the conical member 30 so as to rotate the conical member 30, and thus the drum 32, mirror 18 and screen 16. For stability purposes, the top of the drum 32 and top plate 42 of the cylinder 40 may interface at a bearing structure 72 or the like.

The respective pulley assemblies that rotate the lens assembly 14 and the conical member 30 are selected such that the lens assembly 14 rotates at a rate one-half that of the conical member 30, and thus the rear projection screen 16. This can be easily accomplished, for example, by having driven pulley 66 be twice the diameter of driven pulley 60, and associated pulleys 70 and 64, respectively, being of the same diameter. Thus, with each rotation of the motor shaft 24, the conical member 30 will rotate twice for every rotation of the lens assembly 14. The invention contemplates other mechanisms for rotating the rear projection screen 16 at twice the rate of the Pechan prism, and such alternative mechanisms and methods could be substituted for the preferred method described above.

Figure 4:
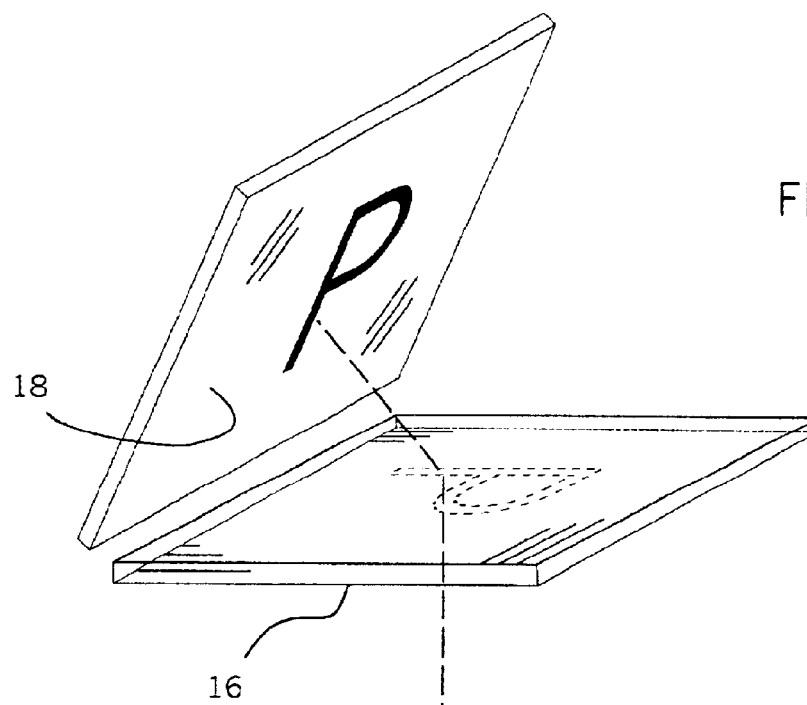
FIG. 4 is a perspective view of a rear projection screen used in accordance with the present invention and having an image "P" in phantom, and a mirror disposed over the screen for reflecting the image "P"

The rear projection screen 16 rotates at a high rate of speed, preferably approximately 1440 RPM. This is necessary so that the projected image appears to be viewed substantially simultaneously around the 360° viewing arc surrounding the apparatus 10. In the U.S. Pat. No. 6,072,545 device, the mirrors were constructed of highly reflective Mylar film stretched over a Styrofoam frame. However, it was found that at the high rate of rotational speeds generated by the apparatus 10, the Mylar film and Styrofoam frame mirrors deformed overtime. Accordingly, the present invention utilizes a first surface mirror 18 bonded to a honeycomb structure 74, preferably comprised of light weight but rigid aluminum. This arrangement creates an extremely stiff base for the mirror 18 so as to counteract any deformation of the mirror 18 due to centrifugal forces generated at high rotation speeds. Thus, the reflection of the image projected through the rear projection screen 16 by the mirror 18, as illustrated in FIG. 4, will not be distorted.

Although it is preferred that the mechanical rotation of the lens assembly 14 described above be implemented in the present invention to simplify the design, operation and cost of the apparatus 10, it is possible, however, that an electronic image rotation system 76 be utilized to electronically rotate the video image projected through the lens assembly 14. In this regard, and with reference to FIG. 8 the electronic image rotation system 76 electronically rotates the video image projected through the projection lens assembly 14 after processing a composite input video signal into a separate format of red, green, and blue signals, and horizontal and vertical synchronization pulses. The image rotation system makes the image displayed by the light valves 44a–c appear to rotate by electronically storing the separated synchronization pulses and color date of the video input signal in random access memories, and then processing the stored data to generate the image at various angles of rotation as schematically illustrated in FIG. 7.

Figure 8:
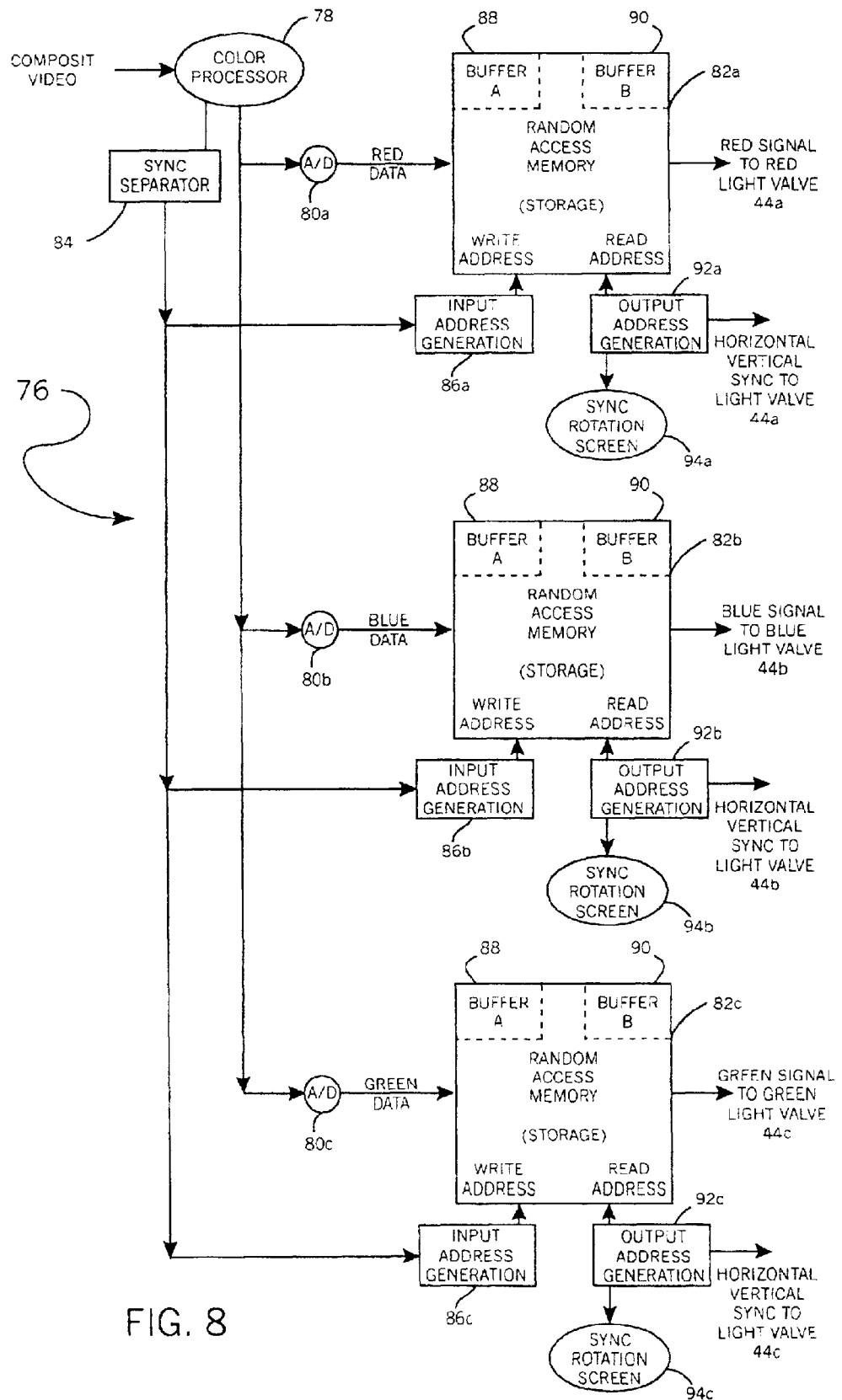
FIG. 8 is a logic diagram illustrating the processing of a composite video signal to create a step-rotating image in the face of each of the three light valves surrounding the Phillips prism of FIG. 6.

More specifically, with reference to FIG. 8, a color processor circuit 78 separates red, green and blue image data contained in the composite video input signal. These analog signals are converted to a digital format by analog to digital converters 80a–c. After being converted to a digital format, the red, green and blue image data is stored in respective random access memories (RAM) 82a–c. The composite video input signal is also separated into horizontal and vertical synchronization pulses by a sync separator circuit 84. The horizontal and vertical synchronization pulses provide input to input address generation circuits 86a–c, which dictates how digital information from the converters 80a–c is stored within the RAM 82a–c.

Each RAM 82 creates a buffer A 88 and a buffer B 90 which are alternately used for receiving/storing the incoming video signal and creating an outgoing rotated video signal. The digital red, green and blue image data is stored in the respective buffer A 88 while the buffer B 90 is used in creating the rotated video output signal. After the buffer A has been used for storage and the rotated output signal has been created in buffer B, the buffers A and B are interchanged in use such that color image data is stored in the buffer B while the buffer A is used in creating the rotated output signal. The buffers A and B alternate functions in this manner continuously. To facilitate the storage of received data in the RAM 82, the input address generation circuit 86 resets at the beginning of each video frame to select an initial, predetermined RAM location in either the buffer A or the buffer B for storage. This reset action is timed to coincide with every other vertical synchronization pulse inputted by the sync separator circuit 84 to the input address generation circuit 86.

Output address generation circuits 92a–c select data stored in the RAM 82a–c according to an algorithm which recreates a video output signal from the stored data. The output address generation circuits 92a–c electronically rotate the input image in a stepped fashion. This stepped rotation occurs at a sufficiently rapid rate (at least 1440 rpm) so that the human eye only perceives continuous movement. The output address generation circuits 92a–c may also utilize the algorithm to distort the rotated video output signal as desired. The output address generation circuits 92a–c send to the respective light valve 44a–c the rotated, distorted video output signal, in stepped pulses.

Viewing of the image is controlled by the window that rotates in synchronization with the screen 16. The synchronization of the viewing window's location with the rotation of the screen is provided by sync rotating screen circuits 94a–c, which receive input from the output address generation circuits 92a–c. In such embodiment, the lens assembly 14 is not rotated.

It will be appreciated by those skilled in the art that the positioning of the mirror 18 at a 45° angle over the horizontally disposed rear projection screen 16 will reflect the image at a right angle. With typical rear projection screens 16, the clear image would only be able to be viewed in a line of sight corresponding to the width and length of the rear projection screen 16. A viewer would not clearly be able to see the image above or below this "window". Additionally, the problem of blurring at the edges, as described above, would be present as well.

Figure 5A:
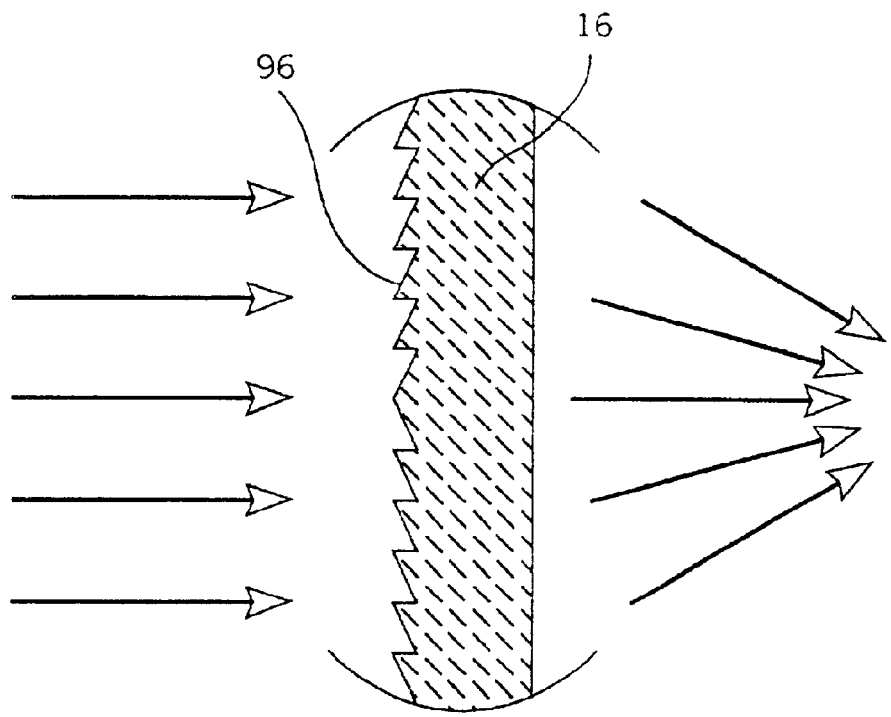
FIG. 5A is an enlarged fragmented vertical section of the projection screen taken generally of the area indicated by the number "5" in FIG. 2.
Figure 5B:
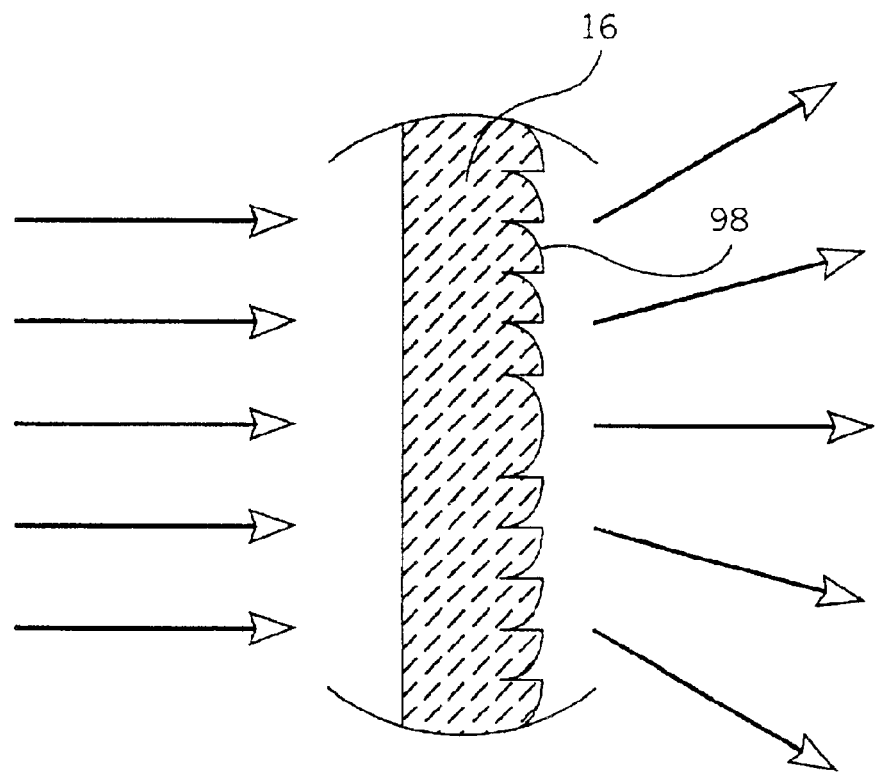
FIG. 5B is an enlarged fragmented vertical section of the projection screen taken generally of the area indicated by the reference number "5" in FIG. 2, and which is turned one-quarter turn from the view of FIG. 5A.

With reference to FIGS. 5A and 5B, the rear projection screen 16 is provided with two distinctly different surfaces which act to expand and contract and constrict the projected image such that the reflected image can be seen above and below the normal line of sight, while removing the blur from the edges of the image. More particularly, with reference to FIG. 5A, which is an enlarged fragmented section of the screen 16 with the viewing orientation being along the longer side of the rectangle defined by the screen 16. The arrows on the left indicate the image as being projected from the projector 12 and lens assembly 14. The front surface 96 forms a fresnel positive cylindrical lens which is parallel to the length of the projection screen. The fresnel lens has a pitch of approximately 0.33 mm and a focal length of approximately F1=730 mm on a radius of a cylinder equal to 360 mm. The front surface provides the means for constricting the width of the projected image generally perpendicularly to the screen's access of rotation. This unique construction of the rear projection screen allows the light generated by the light source of the projector 12 to be focused on a relatively narrow strip that is viewed through the window 38, resulting in a brighter image viewable during the operation of the apparatus 10.

With reference now to FIG. 5B which is an enlarged fragmented section of the projection screen 16 with the viewing orientation taken along the short side of the rectangle defined by the screen 16, such that the orientations of FIG. 5A and FIG. 5B are offset 90° from one another. The top surface 98 of the screen 16 comprises a micro-cylindrical structure on top of a positive macro-cylindrical structure, wherein the macro and micro-cylindrical structures are parallel to the length of the projection screen. The micro-cylindrical structure comprises radial surfaces having a radius of approximately 213 microns and a pitch of approximately 250 microns. The macro-cylindrical structure comprises a radial surface having a radius of approximately 340 mm. This particular surface construction provides means for expanding the projected image generally parallel to the screen's access of rotation so that the image is viewable above and below the mirror 18, as illustrated in FIG. 1.

Thus, in operation, the projector 12 feeds a video image to the lens assembly 14 which expands the video image and projects it onto the bottom or rear surface of the screen 16. The video image is rotated either mechanically or electronically, as described above, in synchronization with the rotation of the rear projector screen 16. The construction of the screen 16 expands the projected image vertically and restricts the horizontal width of the image to concentrate the image and its light intensity into a relatively narrow section. This advantageously increases the intensity of the image viewed through the window 38. In fact, such arrangement eliminates the need for such a window or shutter system. However, it has been found that use of the window 38 and opaque light shielding sections 32 remove unwanted light and further clarifies the image reflected.

Thus, the 360° viewing apparatus of the present invention allows every position surrounding the apparatus 10 to see the picture in the best possible viewing angle. Although the system can be manufactured to approximate the size of an existing television set, the screen 16 of the apparatus 10 is optically based, and it is possible to scale up the apparatus 10 to a cinema size image or even larger. With the advent of digital projectors in movie theaters, it is conceivable that the system of the present invention could be implemented into movie studios and theater chains. Other applications include the use of the apparatus 10 in sports bars, restaurants, classrooms, museums, board rooms, casinos, video arcades, airport schedule displays, and home theaters. The present invention can be particularly useful in video conferencing as the system, combined with a camera using a panospheric lens, creates the perfect video conferencing setup which enables a number of participants to sit around the system and simultaneously view the video conference.

Although several embodiments have been described in detail for purposes of illustration, various modifications may be made without departing from the scope and spirit of the invention. Accordingly, the invention is not to be limited, except as by the appended claims.

What is claimed is:

1. A video image rotating apparatus, comprising:
   a rear projection screen rotatably disposed in a generally horizontal plane;
   a single mirror angularly positioned over the screen so as to rotate with the screen;
   an optical system positioned below the screen and aligned therewith for projecting images onto the screen;
   a rotatable drum supporting the mirror and supporting the screen in a base thereof;
   a conical member disposed between the optical system and the screen that facilitates the protection of the images onto the screen; and
   means for synchronously rotating the screen and the projected images at a predetermined relative rate of rotation such that all viewers see the projected images substantially simultaneously.

2. The apparatus of claim 1, wherein the optical system includes a projector for creating the image, and an optic means.

3. The apparatus of claim 2, wherein the projector includes light valve means comprising a plurality of light valves and a Phillips prism that aligns images produced by the light valves for projection through the optic means.

4. The apparatus of claim 2, wherein the optic means comprises a projection lens assembly.

5. The apparatus of claim 4, wherein the optic means further comprises a Pechan prism.

6. The apparatus of claim 2, wherein the optic means is vertically aligned with a center axis of the screen.

7. The apparatus of claim 1, wherein the synchronously rotating means comprises a motor operably connected to rotate the screen and mirror at a first rate of rotation, and operably connected to rotate at least a portion of the optical system at a second rate of rotation.

8. The apparatus of claim 7, wherein the motor is connected to an optic means comprising a Pechan prism and a projection lens assembly to rotate the Pechan prism at a rate of rotation which is one-half that of the screen.

9. The apparatus of claim 7, including a first pulley assembly operably interconnected to a shaft of the motor and the screen and mirror and a second pulley assembly interconnected between a shaft of the motor and the optical system.

10. The apparatus of claim 1, wherein the synchronously rotating means comprises a motor operably connected to rotate the screen and mirror, and an electronic image rotation system that synchronously rotates a video image created by the optical system with the rotation of the screen and mirror.

11. The apparatus of claim 10, wherein the electronic image rotation system includes:
- a color processor circuit for separating red, green, and blue signals contained in a composite video input signal;
- analog to digital conversion means for converting the red, green and blue signals from an analog to a digital format;
- random access memory means for storing digital red, green and blue image data;
- an output address generation circuit which selects data stored in the random access memory means according to an algorithm that creates a rotated video output signal from the stored image data such that an image recreated from the rotated video output signal will appear rotated from a stored image.

12. The apparatus of claim 1, wherein the rear projection screen includes means for expanding the projected image generally parallel to the screen's axis of rotation, and means for restricting the width of the projected image generally perpendicularly to the screen's axis of rotation.

13. The apparatus of claim 11, wherein the expanding means comprises a micro-cylindrical structure parallel to the length of the projection screen on top of a positive macro cylindrical structure parallel to the length of the projection screen.

14. The apparatus of claim 11, wherein the means for constricting the width of the projected image generally perpendicular to the screen's axis of rotation comprises a second surface of the screen that forms a fresnel positive cylindrical lens parallel to the width of the projection screen.

15. The apparatus of claim 1, wherein the mirror is angularly disposed over the screen at a 45° angle.

16. A video image rotating apparatus, comprising:
- a rear projection screen rotatably disposed in a generally horizontal plane;
- a single mirror angularly positioned over the screen so as to rotate with the screen;
- an optical system positioned below the screen and vertically aligned with a center axis thereof for projecting images onto the screen; and
- a motor operably connected to rotate the screen and mirror at a first rate of rotation, and operably connected to rotate at least a portion of the optical system at a second rate of rotation such that all viewers see the projected images substantially simultaneously.

17. The apparatus of claim 16, wherein the optical system comprises a projector for creating the image, and an optic means for directing the image onto the screen.

18. The apparatus of claim 17, wherein the projector includes a light valve means comprising a plurality of light valves and a Phillips prism that aligns images produced by the light valves for projection through the optic means.

19. The apparatus of claim 17, wherein the optic means comprises a Pechan prism and a projection lens assembly.

20. The apparatus of claim 17, wherein the motor is connected to the optic means comprising a Pechan prism and a projection lens assembly to rotate the optic means at a rate of rotation which is one-half that of the screen.

21. The apparatus of claim 17, including a first pulley assembly operably interconnected to a shaft of the motor and the screen and mirror and a second pulley assembly interconnected between a shaft of the motor and the optic means.

22. The apparatus of claim 16, wherein the rear projection screen includes means for expanding the projected image generally parallel to the screen's axis of rotation, and means for restricting the width of the projected image generally perpendicularly to the screen's axis of rotation.

23. The apparatus of claim 22, wherein the expanding means comprises a micro-cylindrical structure parallel to the length of the projection screen on top of a positive macro cylindrical structure parallel to the length of the projection screen.

24. The apparatus of claim 22, wherein the means for constricting the width of the projected image generally perpendicular to the screen's axis of rotation comprises a second surface of the screen that forms a fresnel positive cylindrical lens parallel to the width of the projection screen.

25. The apparatus of claim 16, wherein the mirror is angularly disposed over the screen at a 45° angle.

26. The apparatus of claim 16, including a rotatable drum supporting the mirror and the screen in a base thereof, and a conical member disposed between the optical system and the screen that facilitates the projection of the images onto the screen.

27. A video image rotating apparatus, comprising:
- a rear projection screen rotatably disposed in a generally horizontal plane;
- a single mirror positioned over the screen at a 45° angle so as to rotate with the screen;
- an optical system positioned below the screen and vertically aligned with a center axis thereof for projecting images onto the screen, the optical system including a projector for projection of an image through an optic means, the optic means comprising a Pechan prism and a projection lens assembly for directing the image onto the screen; and
- a motor operably connected to rotate the screen and mirror at a first rate of rotation, and operably connected to the optic means to rotate the optic means at a rate of rotation which is one-half that of the screen such that all viewers see the projected images substantially simultaneously.

28. The apparatus of claim 27, including a first pulley assembly operably interconnected to a shaft of the motor and the screen and mirror and a second pulley assembly interconnected between a shaft of the motor and the optic means.

29. The apparatus of claim 27, wherein the rear projection screen includes means for expanding the projected image generally parallel to the screen's axis of rotation, and means for restricting the width of the projected image generally perpendicularly to the screen's axis of rotation.

30. The apparatus of claim 29, wherein the expanding means comprises a micro-cylindrical structure parallel to the length of the projection screen on top of a positive macro cylindrical structure parallel to the length of the projection screen.

31. The apparatus of claim 30, wherein the means for constricting the width of the projected image generally perpendicular to the screen's axis of rotation comprises a second surface of the screen that forms a fresnel positive cylindrical lens parallel to the width of the projection screen.

32. The apparatus of claim 27, including a rotatable drum supporting the mirror and the screen in a base thereof, and a conical member disposed between the optical system and the screen that facilitates the projection of the images onto the screen.

33. The apparatus of claim 27, wherein the projector comprises a plurality of light valves and a Phillips prism.

34. A video image rotating apparatus, comprising:
- a rear projection screen rotatably disposed in a generally horizontal plane;
- a single mirror angularly positioned over the screen so as to rotate with the screen;
- an optical system positioned below the screen and aligned therewith; for projecting images onto the screen;
- a motor operably connected to rotate the screen and mirror at a first rate of rotation, and operably connected to rotate at least a portion of the optical system at a second rate of rotation such that all viewers see the projected images substantially simultaneously.

35. The apparatus of claim 34, wherein the motor is connected to an optic means comprising a Pechan prism and a projection lens assembly to rotate the Pechan prism at a rate of rotation which is one-half that of the screen.

36. The apparatus of claim 34, including a first pulley assembly operably interconnected to a shaft of the motor and the screen and mirror and a second pulley assembly interconnected between a shaft of the motor and the optical system.

* * * * *